United States Patent [19]
Delp et al.

[11] Patent Number: 5,844,890
[45] Date of Patent: Dec. 1, 1998

[54] COMMUNICATIONS CELL SCHEDULER AND SCHEDULING METHOD FOR PROVIDING PROPORTIONAL USE OF NETWORK BANDWITH

[75] Inventors: Gary Scott Delp; Philip Lynn Leichty, both of Rochester, Minn.

[73] Assignee: International Business Machines Corporation, Armonk, N.Y.

[21] Appl. No.: 823,865

[22] Filed: Mar. 25, 1997

[51] Int. Cl.⁶ .............................. H04J 1/16; H04L 12/28
[52] U.S. Cl. ............................................ 370/230; 370/412
[58] Field of Search ................................. 370/230, 231, 370/232, 235, 237, 397, 395, 412

[56] References Cited

U.S. PATENT DOCUMENTS

| | | | |
|---|---|---|---|
| 4,839,831 | 6/1989 | Imajo et al. | 364/550 |
| 5,274,768 | 12/1993 | Traw et al. | 395/275 |
| 5,359,592 | 10/1994 | Corbalis et al. | 370/17 |
| 5,381,407 | 1/1995 | Chao | 370/58.1 |
| 5,533,009 | 7/1996 | Chen | 370/17 |
| 5,533,020 | 7/1996 | Byrn et al. | 370/60.1 |
| 5,533,021 | 7/1996 | Branstad et al. | 370/60.1 |
| 5,537,408 | 7/1996 | Branstad et al. | 370/79 |
| 5,579,312 | 11/1996 | Regache | 370/60.1 |
| 5,610,921 | 3/1997 | Christensen | 370/395 |
| 5,625,625 | 4/1997 | Oskouy et al. | 370/395 |
| 5,629,928 | 5/1997 | Calvignac et al. | 370/237 |
| 5,694,548 | 12/1997 | Baugher et al. | 395/200.12 |

OTHER PUBLICATIONS

"A Self–Clocked Fair Queueing Scheme For Braodband Applications" by S. Jamaloddin Golestani, Proceeding IEEE Infocom v2, 1994, IEEE, Piscataway, N.J., 94CH3401–7.
"ATM Forum Technical Committee Traffic Management Specification", Version 4.0 (af–tm–0056.000) Apr., 1996.
"Resource ReSerVation Protocol (RSVP)" Version 1, Internet Draft Document, Functional Specification of the Internet Engineering Task Force (IETF), Dated Mar. 18, 1996.

*Primary Examiner*—Ajit Patel
*Assistant Examiner*—Chiho Andrew Lee
*Attorney, Agent, or Firm*—Joan Pennington

[57] ABSTRACT

A method and apparatus are provided for scheduling the transmission of cells of a plurality of data streams in a communications network. A best effort scheduler is provided for scheduling the transmission of cells of a plurality of data streams in a communications network. The best effort scheduler includes a best effort operational mode and can include more than one timing wheel. When the best effort scheduler includes more than one timing wheel, then the priority of the best effort timing wheel is lower than the priority of the other timing wheel or wheels. Data of each data stream is enqueued to a corresponding data cell queue. A target next transmission time for each data cell queue is calculated utilizing predetermined logical channel descriptor parameters. A lower priority or a higher priority timing wheel is selected and a timing wheel time slot is calculated based on an identified target transmission time for each active data cell queue. An active indication is set for the identified timing wheel time slot and an entry is stored to point to the corresponding data cell queue for the identified timing wheel time slot. The relative rates between data streams are maintained, while the absolute rates of the data streams are increased or decreased in the low priority wheel. Scheduling opportunities can be defined utilizing a predefined pseudo data cell queue. Then the calculation of the target transmission time for each data cell queue includes the predefined pseudo data cell queue, and the identified target transmission time for the predefined pseudo data cell queue defines scheduling opportunities of multiple timing wheel time slots.

21 Claims, 16 Drawing Sheets

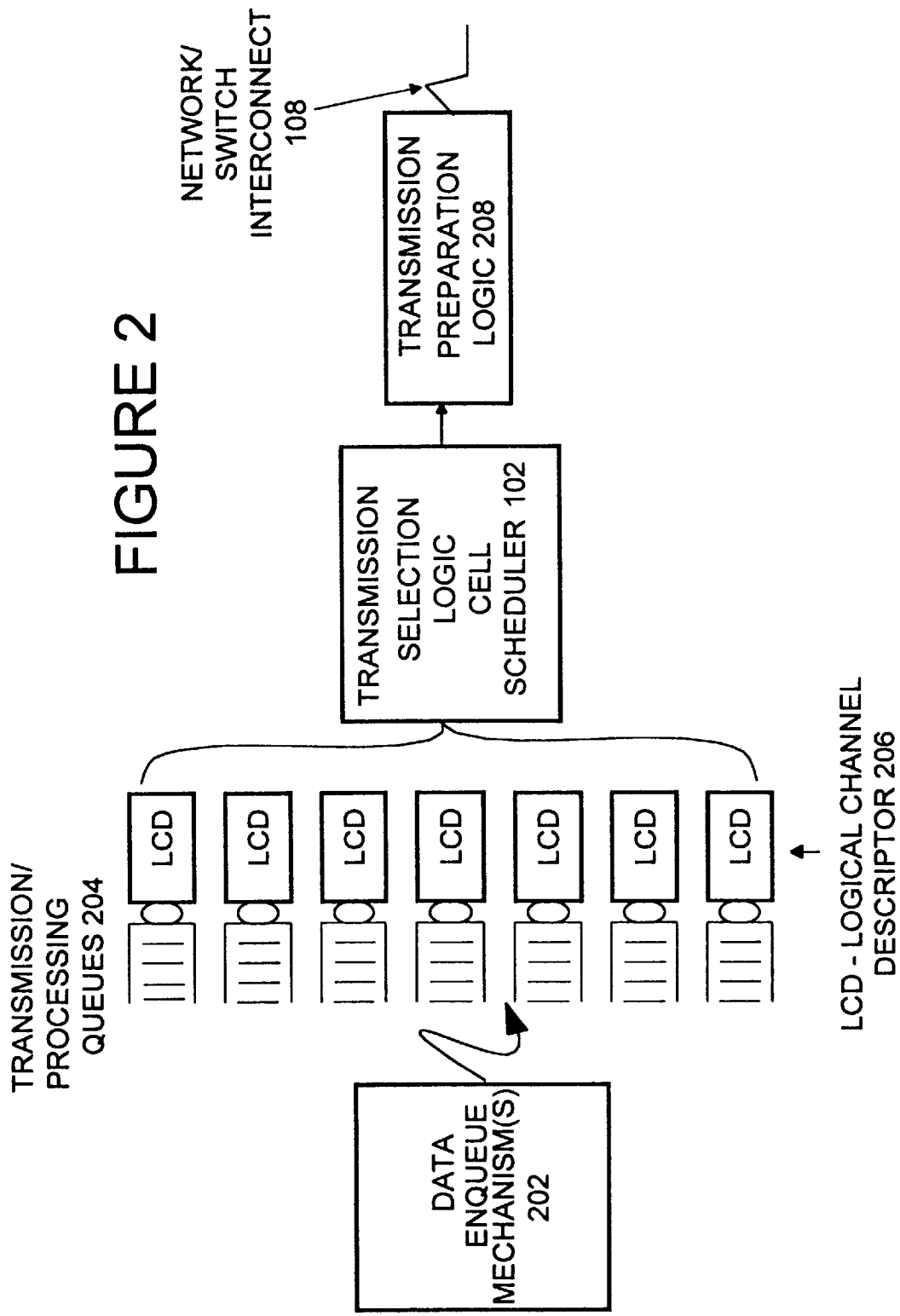

FIGURE 2A

LOGICAL CHANNEL DESCRIPTOR (LCD) 206

NEXT LCD POINTER 209
HEAD OF CELL/PACKET QUEUE 210
TAIL OF CELL/PACKET QUEUE 212
SCHEDULING PARAMETERS 214
SCHEDULING STATE 216
TIMING WHEEL SELECTOR 218

FIGURE 2B

SCHEDULING RATE PARAMETERS 220

PEAK TRANSMISSION RATE 222

SUSTAINABLE TRANSMISSION RATE 224

PEAK BURST LENGTH 226

CBR/VBR TRAFFIC TYPE 228

MAX DELAY 230

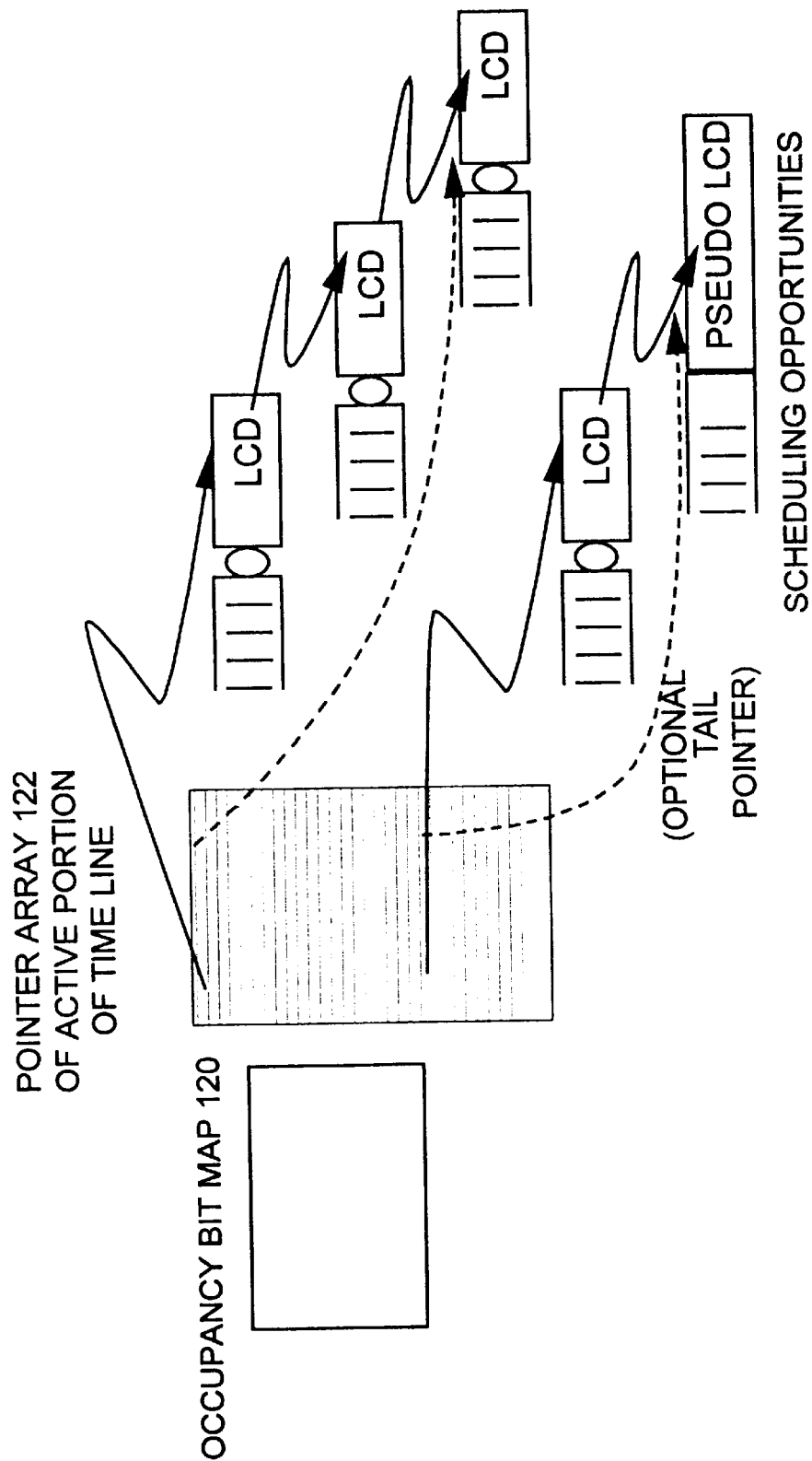

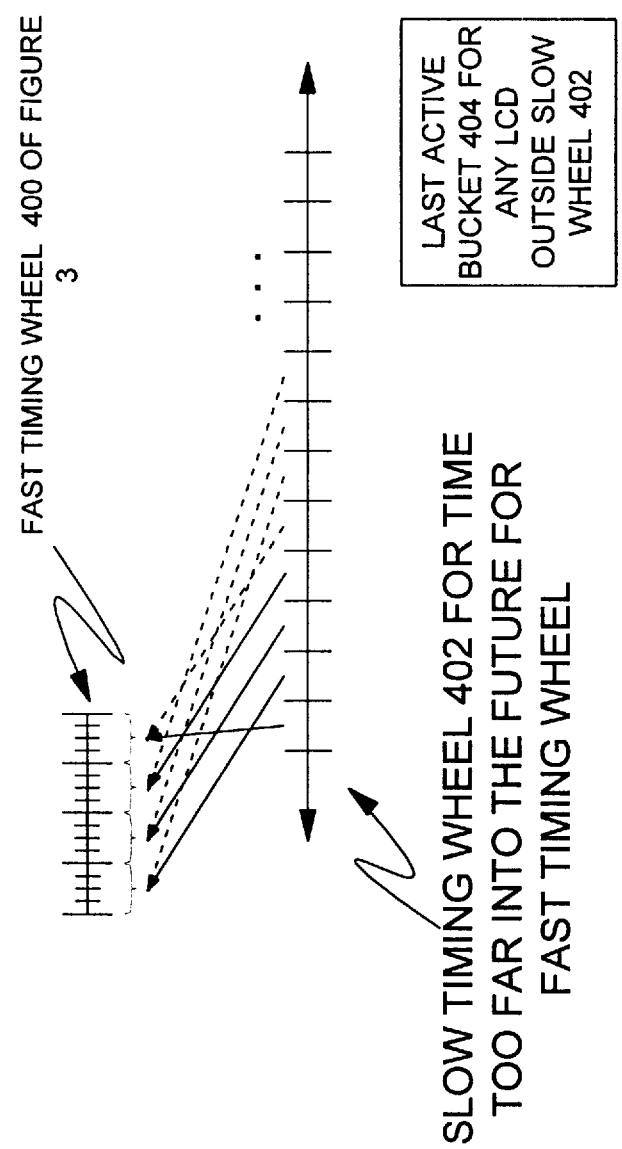

CALCULATE NEW TIMESTAMP=MAX
(OLD TIME STAMP + SUSTAINED INTERVAL,
CURRENT TIME - BURST LIMIT)
730

CALCULATE NEXT TIME SLOT=MAX
(TIMESTAMP + SUSTAINED INTERVAL,
CURRENT TIME + PEAK DELAY) + MAX DELAY
732

FIGURE 8
LEAKY BUCKET SCHEDULER - FULLY LOADED
PRIOR ART

| LCD | AVERAGE SCHEDULING RATE | RATE |
|---|---|---|
| A | 2 | 1/2 |
| B | 5 | 1/5 |
| C | 5 | 1/5 |
| D | 10 | 1/10 |

FIGURE 9
LEAKY BUCKET SCHEDULER - PARTIALLY LOADED PRIOR ART

| LCD | AVERAGE SCHEDULING RATE | RATE |
|---|---|---|
| A | 3 | 1/3 |
| B | 6 | 1/6 |
| C | 9 | 1/9 |
| D | 12 | 1/12 |

FIGURE 10

| LCD | AVERAGE SCHEDULING RATE | RATE |
|---|---|---|
| A | 3 | 1/3 |
| B | 6 | 1/6 |
| C | 9 | 1/9 |
| D | 12 | 1/12 |

FIGURE 11

BEST EFFORT WEIGHTED FAIR QUEUING

| LCD | AVERAGE SCHEDULING RATE | RATE |
|---|---|---|
| A | 3 | 1/3 |
| B | 6 | 1/6 |
| C | 9 | 1/9 |
| D | 12 | 1/12 |

FIGURE 12

| LCD | AVERAGE SCHEDULING RATE | RATE |
|---|---|---|
| A | NO TRAFFIC | 1/3 |
| B | 6 | 1/6 |
| C | 9 | 1/9 |
| D | 12 | 1/12 |

FIGURE 13

BEST EFFORT WEIGHTED FAIR QUEUING

| LCD | AVERAGE SCHEDULING RATE | RATE |
|---|---|---|
| A | –0 TRAFFIC | 1/3 |
| B | 6 | 1/6 |
| C | 9 | 1/9 |
| D | 12 | 1/12 |

COMMUNICATIONS CELL SCHEDULER AND SCHEDULING METHOD FOR PROVIDING PROPORTIONAL USE OF NETWORK BANDWITH

RELATED APPLICATION

A related patent application is copending Ser. No. 08/823,155, filed on the same date as the present application, entitled: AN EARLIEST DEADLINE FIRST COMMUNICATIONS CELL SCHEDULER AND SCHEDULING METHOD FOR TRANSMITTING EARLIEST DEADLINE CELLS FIRST, by Gary S. Delp et al., and assigned to the present assignee.

FIELD OF THE INVENTION

The invention relates to the scheduling of multiple data streams through a data communications network, and more particularly, to the choice of which cell or packet should be transmitted or passed on from a network element when there are multiple potential streams with data that could be transmitted or passed on. Further the invention describes a method for scheduling cell transmissions that provides proportional use of available network bandwidth.

DESCRIPTION OF THE PRIOR ART

Multimedia communications involve the blending together of computer data processing, audio/video, and display technology in an interactive environment. Evolving multimedia applications such as desktop computer conferencing and video-on-demand bring with them the need for network access to shared or common real-time data.

A Motion Pictures Experts Group MPEG-2 standard for multimedia stream transport is described in "MPEG-2" International Organization for Standardization; organization Internationale De Normalisation (ISO/IEC ITC1/SC29/WG11) Coding of Moving Pictures and Associated Audio. The MPEG-2 standard has defined a system layer that integrates multiple media sources into a single data stream with integrated time stamps or program clock references (PCRs). The MPEG-2 standard has defined a fixed and variable rate encoding scheme for video streams that allows for variable size and quality of video streams. The MPEG-2 standard has defined a transport mechanism for other video encoding schemes, for example, MPEG-1. The MPEG-2 multimedia stream is transported over a digital network which uses the ITU standards commonly referred to as Asynchronous Transfer Mode (ATM). The Asynchronous Transfer Mode (ATM) network described in "Asynchronous Transfer Mode: Solution for Broadband ISDN", M de Prycker, Ellis Horwood, 1991 is an internationally agreed upon technique for transmission, multiplexing and switching in a broadband network. It uses fixed size cells as a unit of transmission.

ATM networks are designed to support the integration of high quality voice, video, and high speed data traffic. To the end-user, it promises to provide the ability to transport connection-oriented and connectionless traffic at constant or variable bit rates. It allows for allocation of bandwidth on demand and intends to provide negotiated Quality-of-Service (QOS). To a network provider, it enables the transport of different traffic types through the same network. In order for a network to meet QOS requirements as set by the user for a session, the network must have sufficient information about the traffic characteristics of the session. This may be approximated by (but not limited to) three basic parameters: 1) average transmission rate, 2) peak transmission rate, and 3) the interval over which the data may be transmitted at peak rate. As a part of the QOS contract with the network, all sessions must abide by the traffic parameters and not violate these parameters in order for the network to guarantee QOS to all the users. This gives rise to a complex scheduling problem when many sessions are established over a network link, which requires that each session's contract with the network not be violated. At the same time, all sessions must get the desired capacity from the network. This problem is fairly complex particularly when it involves a large number of sessions with a wide range of traffic descriptors. The problem is further compounded with the fact that different sessions require different QOS. Therefore, in case of contention, where a multiplicity of sessions have data to be transmitted and their individual contracts with the network will allow them to transmit, sessions requiring stricter QOS guarantee typically are given priority over other sessions.

A publication entitled "A Self-Clocked Fair Queueing Scheme for Broadband Applications", by Jamaloddin Golestani, Proceedings IEEE INFOCOM v 2 1994. IEEE, Piscataway, N.J., USA, 94CH3401-7. P 636–646 discloses and analyzes performance of an efficient fair queuing scheme which is feasible for broadband implementation. Fairness is defined in a self-contained manner, eliminating the need for the hypothetical fluid-flow reference system used in the present state of art and thereby removing the associated computational complexity. The disclosed scheme is based on the adoption of an internally generated virtual time as the index of work progress, hence the name self-clocked fair queuing. The disclosed scheme possesses a desired fairness property and is nearly optimal, in the sense that the maximum permissible disparity among the normalized services offered to the backlogged sessions is nevermore than two times the corresponding figure in any packet based queuing system.

In ATM networks, one known algorithm called the leaky bucket algorithm has been used to determine when a cell for a single session may be transmitted. This leaky bucket algorithm may be used to determine if a cell is allowed to be transmitted for any single session at a given time. Scheduling a multiplicity of sessions can be provided by running the leaky bucket algorithm at any time t for all the sessions to determine which sessions may be scheduled for transmission at that time. Then, cells from these sessions may be scheduled based on their assigned priorities. The leaky bucket algorithm is described in ATM Forum Technical Committee Traffic Management Specification, Version 4.0 (af-tm-0056.000) April, 1996.

An Internet Draft document, entitled "Resource ReSerVation Protocol (RSVP)" Version 1 Functional Specification of the Internet Engineering Task Force (IETF) dated Mar. 18, 1996 describes a version 1 of RSVP, a resource reservation setup protocol designed for an integrated services Internet. RSVP provides receiver-initiated setup of resource reservations for multicast or unicast data flows, with good scaling and robustness properties. A scheduling algorithm implementation advantageously should be compatible with the RSVP protocol.

A traditional ATM cell scheduler conforms to the generic cell rate algorithm (GCRA). This algorithm makes sure that each virtual circuit does not violate it traffic contract, that is, it does not send data over a connection in violation of it sustained cell rate or its peak cell rate. When a schedule is set up to work this way, then it is not able to send faster than the specified peak rate. This is AT MOST scheduling. For example, U.S. Pat. No. 5,533,020, entitled ATM CELL SCHEDULER, issued Jul. 2, 1996 to Byrn et al., and assigned to the present assignee, discloses an ATM cell scheduler for AT MOST scheduling.

In many cases, low priority traffic needs to be scheduled proportionally, that is traffic of one class or task needs to be guaranteed a Minimum allotment, that is it needs to be scheduled AT LEAST. A problem exists in that such at least scheduling needs to be scaled proportionally, and needs to interoperate with the at most mode of scheduling.

A need exists for an improved method and apparatus for scheduling the transmission of cells in a communications network.

SUMMARY OF THE INVENTION

Important objects of the present invention are to provide improved methods and apparatus for scheduling the transmission of cells and frames in a communications network; to provide an improved scheduler and methods for scheduling cell transmissions that provides proportional use of available network bandwidth; and to provide such methods and apparatus that overcome disadvantages of prior art arrangements.

In brief, a method and apparatus are provided for scheduling the transmission of cells of a plurality of data streams in a communications network. A best effort scheduler is provided for scheduling the transmission of cells of a plurality of data streams in a communications network. The best effort scheduler includes a best effort operational mode and can include more than one timing wheel. When the best effort scheduler includes more than one timing wheel, then the priority of the best effort timing wheel is lower than the priority of the other timing wheel or wheels.

Data of each data stream is enqueued to a corresponding data cell queue. A target next transmission time for each data cell queue is calculated utilizing predetermined logical channel descriptor parameters. A lower priority or a higher priority timing wheel is selected and a timing wheel time slot is calculated based on an identified target transmission time for each active data cell queue. An active indication is set for the identified timing wheel time slot and an entry is stored to point to the corresponding data cell queue for the identified timing wheel time slot. The relative rates between data streams are maintained, while the absolute rates of the data streams are increased or decreased in the low priority wheel.

Scheduling opportunities can be defined utilizing a predefined pseudo data cell queue. Then the calculation of the target transmission time for each data cell queue includes the predefined pseudo data cell queue, and the identified target transmission time for the predefined pseudo data cell queue defines scheduling opportunities of multiple timing wheel time slots.

A next data cell queue is selected for transmission by checking for the active indication in a current timing wheel time slot of the first timing wheel. Responsive to identifying the active indication, a first data cell queue is processed for transmission and the data cell queue is rescheduled. Then moving to a next time timing wheel time slot is performed by checking for an active indication in a current frame of timing wheel time slots of the first timing wheel; and responsive to identifying the active indication in the current frame, moving to a first active timing wheel time slot in the current frame is provided. A data cell queue from the lower priority timing wheel can be transmitted when a high priority data cell queue from the higher priority timing wheel is not eligible to be transmitted.

BRIEF DESCRIPTION OF THE DRAWING

The present invention together with the above and other objects and advantages may best be understood from the following detailed description of the preferred embodiments of the invention illustrated in the drawings, wherein:

FIG. 2 is a block diagram representation illustrating the operation of the cell scheduler of the preferred embodiment of FIG. 1;

FIG. 2A is a chart illustrating a logical channel descriptor (LCD) for a data stream used by the cell scheduler of the preferred embodiment of FIG. 1;

FIG. 2B is a chart illustrating scheduling rate parameters for a constant bit rate, variable bit rate or a leaky bucket rate;

FIG. 3 is a schematic and block diagram representation illustrating data structures including a time wheel of the cell scheduler of the preferred embodiment of FIG. 1;

FIG. 4 is a schematic and block diagram representation illustrating fast and show time wheels and a last active bucket of the cell scheduler of the preferred embodiment of FIG. 1;

FIG. 8 is a chart illustrating operation of a prior art leaky bucket scheduler that is fully loaded;

FIG. 9 is a chart illustrating operation of a prior art leaky bucket scheduler that is partially loaded;

FIG. 10 is a chart illustrating exemplary operations of a best effort weighted fair queuing cell scheduler of the preferred embodiment of FIG. 1;

FIG. 11 is a chart illustrating further exemplary operations following FIG. 10 of a best effort weighted fair queuing cell scheduler of the preferred embodiment of FIG. 1;

FIG. 12 is a chart illustrating exemplary operations of a best effort weighted fair queuing cell scheduler of the preferred embodiment of FIG. 1; and FIG. 13 is a chart illustrating further exemplary operations following FIG. 12 of a best effort weighted fair queuing cell scheduler of the preferred embodiment of FIG. 1.

DETAILED DESCRIPTION OF THE PREFERRED EMBODIMENTS

Figure 1:
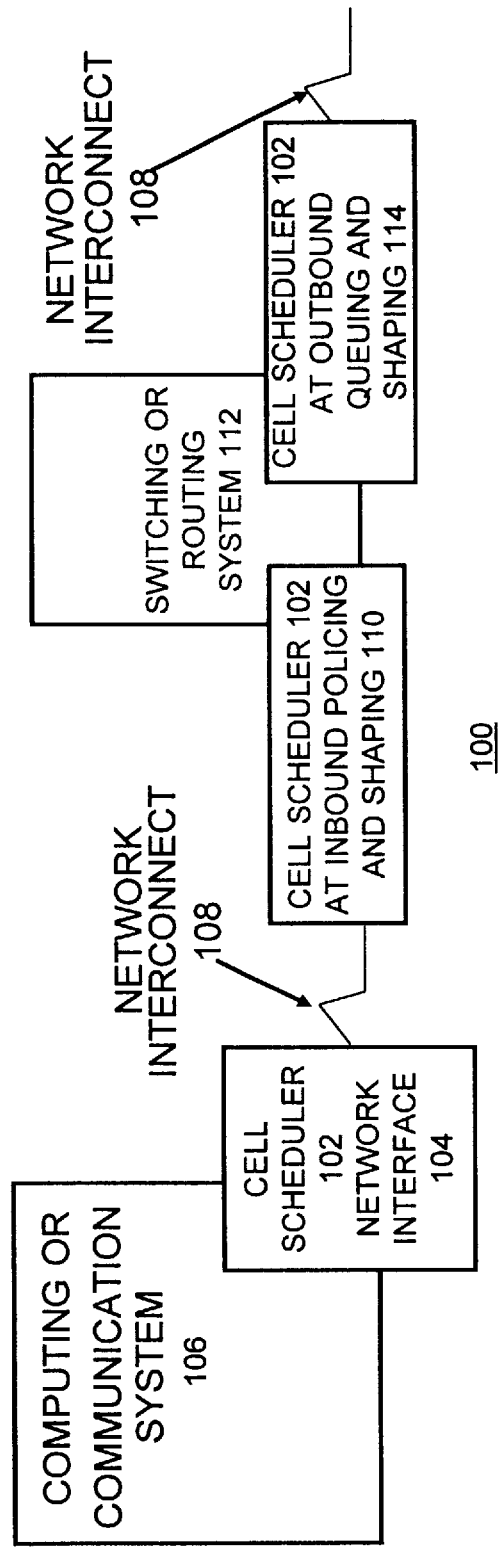
FIG. 1 is a block diagram representation illustrating a communications network system including cell schedulers of the preferred embodiment.

Having reference now to the drawings in FIG. 1, there is shown a packet-switching communications system 100 including at least one cell scheduler 102 of the preferred embodiment. As shown in FIG. 1, cell scheduler 102 advantageously is used at each network interconnect 108 at the ingress to or outbound from the network 100. Cell scheduler 102 advantageously is included with a network interface 104 of a computing or communication system 106, at an inbound policing and shaping input 110 of a network internal switching or routing system 112, and/or at an outbound queuing and shaping output 114 of the switch or router 112.

The cell scheduler 102 includes functional operations as a scheduler disclosed in U.S. Pat. No. 5,533,020, entitled ATM CELL SCHEDULER, issued Jul. 2, 1996 to Byrn et al., and assigned to the present assignee. The subject matter of the above-identified patent is incorporated herein by reference.

In accordance with features of the invention, cell scheduler 102 schedules cell transmissions to provide proportional use of available network bandwidth with effective and efficient fair queuing. Cell scheduler 102 includes multiple timing wheels, for example, three priority wheels. Cell scheduler 102 uses one timing wheel that is run at a low priority as fast as possible. Just as there are cases in the network 100 where traffic must be limited to its traffic contract so that the instantaneous offered load on the network has an upper bound, so also are there cases where the network should be utilized fully but fairly. This is often the case when there are multiple priorities of traffic on the network 100. With cell scheduler 102, the higher priority traffic is shaped with the strict leaky bucket algorithm, and the lower priority traffic is sent with a scheduling mechanism called best effort of the preferred embodiment. When these two disciples are mixed on the network 100 by the cell scheduler 102, the higher priority traffic can be easily identified inside the network, and the quality of service guaranteed to this traffic is not compromised by the lower priority traffic.

Cell scheduler 102 is a multiple priority scheduler with strict priorities, arranged so that a scheduled entity in the higher priority scheduler can optionally be a scheduling opportunity of the lower priority scheduler. Cell scheduler 102 can have two scheduler timing wheels such as timing wheels 400, 402 illustrated in FIG. 4. The priority of the first timing wheel 400 is higher priority than the priority of the second timing wheel 402, so that when the first timing wheel 400 has traffic eligible for transmission, this first timing wheel traffic will be transmitted in preference to traffic from the low priority, second timing wheel 402. One potential drawback to this approach is that the second timing wheel 402 can starve or suffer from no transmission opportunities for a long period of time. If a round robin technique or other technique is used between the wheels, the priority is not observed or followed. The solution provided by cell scheduler 102 is to include in the LCDs on the first timing wheel 400, an LCD that instead of being passed to the transmission creation logic, instead yields a time slot to the second lower priority timing wheel 402. This has the effect of providing some window for transmission for the traffic on the second timing wheel 402, while placing a limit on the amount of time, for maintaining the priority.

Figure 7:
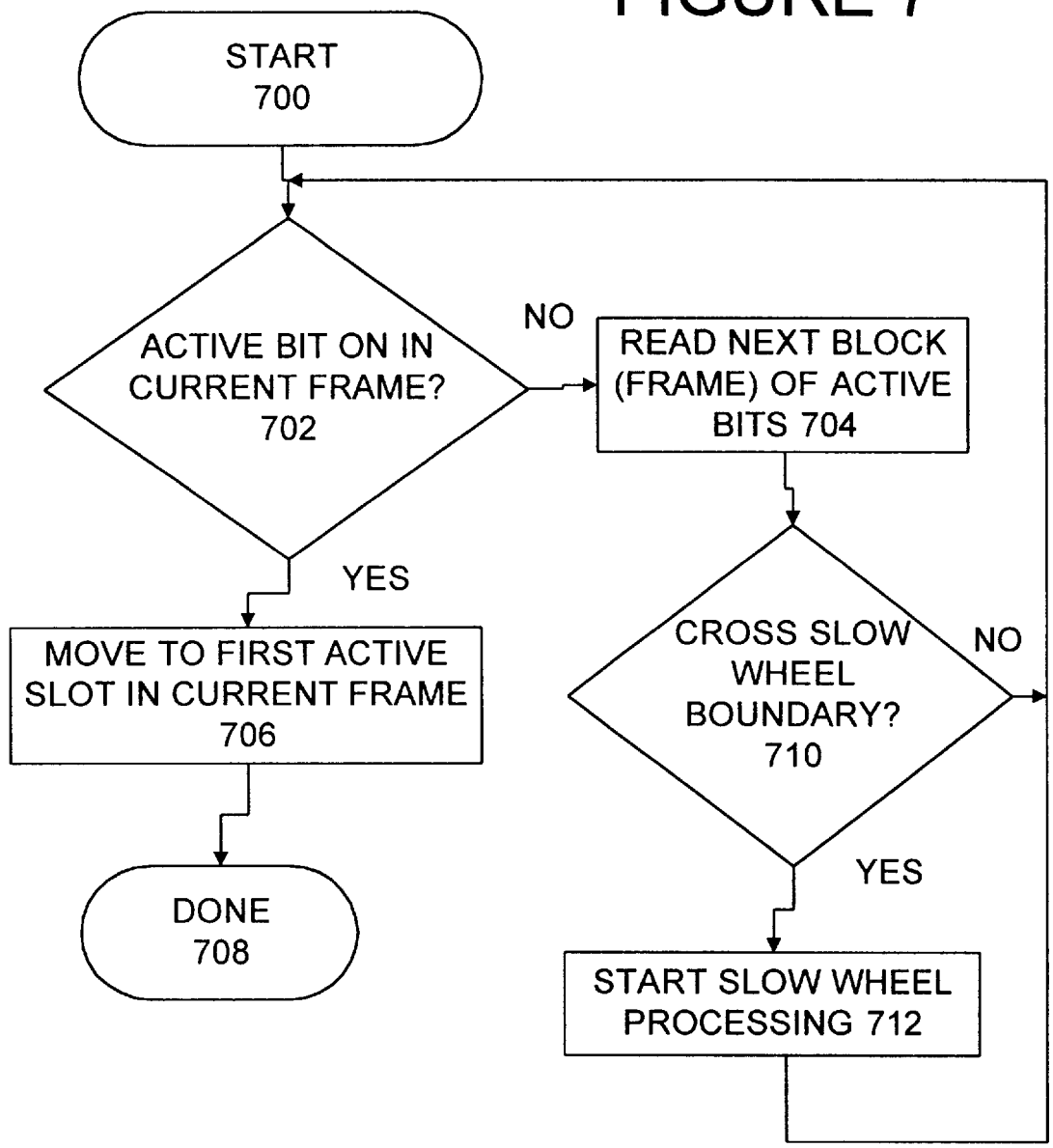
FIG. 7 is a flow chart illustrating sequential operations of the cell scheduler of the preferred embodiment of FIG. 1 to determine a move to a next time slot.
Figure 7A:
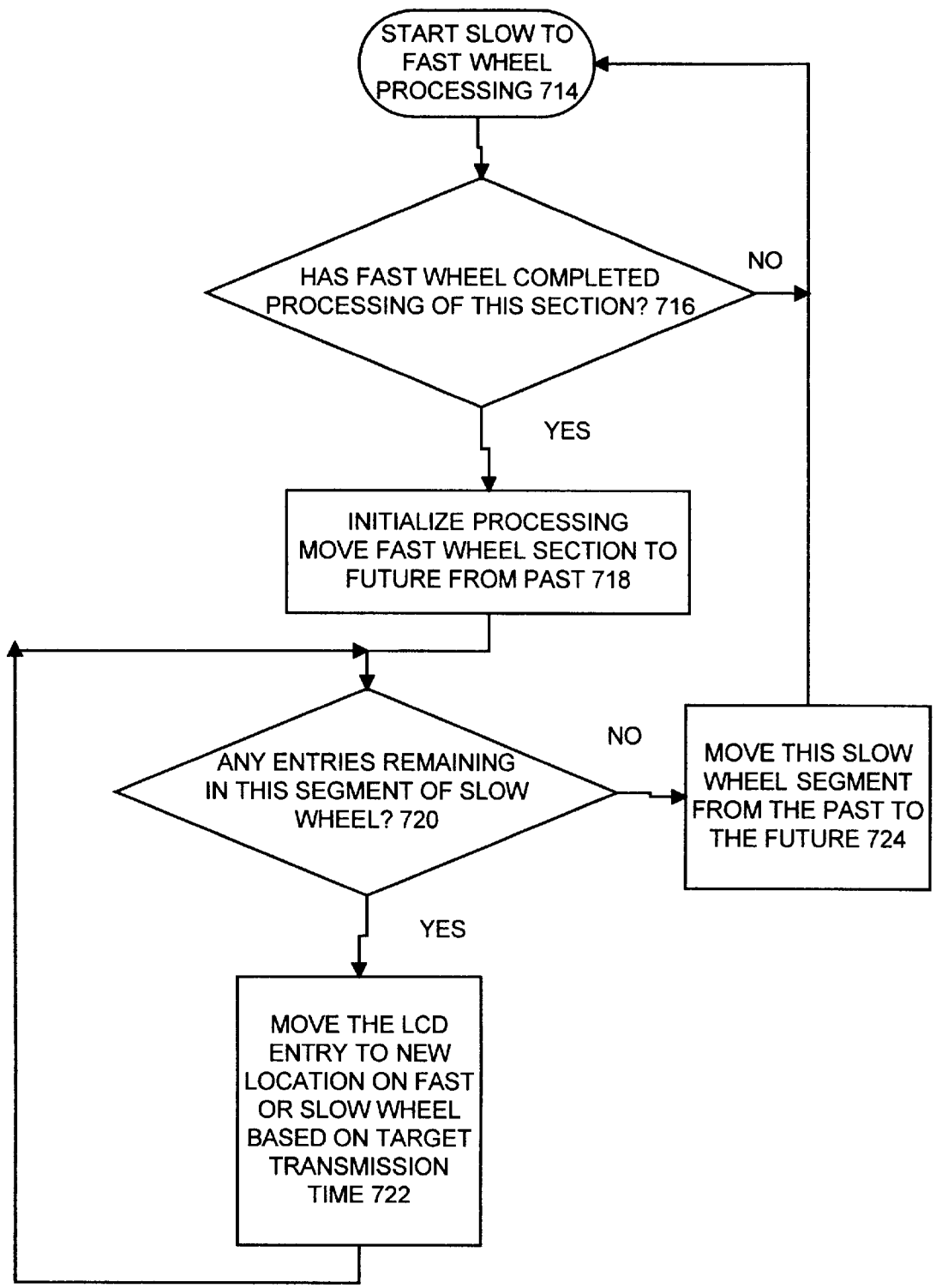
FIG. 7A is a flow chart illustrating exemplary steps for processing the slow timing wheel data of FIG. 7 of the cell scheduler of the preferred embodiment of FIG. 1.

To realize the benefits of the lower priority wheel, that of offering to the network 100 enough traffic to "fill the pipe", that is, traffic which will be able to be transmitted when there is no high priority traffic that is eligible to be transmitted, a mechanism to move the time pointer forward is arranged as illustrated and described with respect to FIGS. 7 and 7A. As illustrated and described with respect to FIGS. 7 and 7A, cell scheduler 102 includes a first timing wheel arranged for scheduling the transmission of ATM cells based on a sustainable cell rate and a peak rate, a high priority time wheel which runs as specified in the above identified U.S. Pat. No. 5,533,020, and a lower priority time wheel arranged to optionally run faster utilizing available transmission scheduling opportunities.

The operation of a timing wheel of cell scheduler 102 may be understood as follows. Cell scheduler 102 keeps track of the current time of the system by a global variable, curr_slot which equals the current time in timing wheel time slots or ticks. Cell scheduler 102 allows curr_slot to advance not based on a clock, but on the availability of cell transmission opportunities.

For each LCD connection (i) the constants that are maintained include a mean interval in slots, mean_int(i); a product of the mean interval, and the burst size in slots, bmproduct(i); and the minimum cell inter-arrival time in slots, peak_int(i). Dynamic connection variables that are maintained include the state of the leaky bucket, state(i), which is updated each time a cell is transmitted using the sum of the mean_int(i) and which ever is greater of the current state or {curr_slot—bmproduct(i)}; and the slot in the timing wheel where the cell from connection (i) is placed, qslot(i).

At initialization, a basic scheduling algorithm of cell scheduler 102 sets the curr_slot=0; and state(i) =curr_slot+ mean_int(i)−bmproduct(i).

There are two cases to be considered for deciding where the scheduling algorithm will enqueue an LCD on the timing wheel:

1). A Packet from connection (i) is presented for transmitting to the scheduling algorithm of cell scheduler 102,
   a) If LCD is already on the Timing Wheel, then:
   Add packet to the LCD queue.
   b) If LCD is not on the Timing wheel, then add packet to the LCD queue, update the leaky bucket state, state(i) and the timing wheel (TW) time slot, qslot(i), for the cell from connection (i), then:

$$state(i)=mean\_int(i)+max\{state(i), curr\_slot-bmproduct(i)\}$$

$$qslot(i)=max\{state(i), curr\_slot\}+peak\_int(i)$$

and enqueue the LCD on the timing wheel time slot at qslot(i).

2) A cell from connection (i) has just been selected by the scheduling algorithm of cell scheduler 102,
   a) If there are no packets or cells queued on this LCD,
   Remove LCD from timing wheel (transmit nothing).
   b) If there are more cells to be transmitted, then update state(i) and qslot(i) and enqueue on the timing wheel:

i.) $state(i)=mean\_int(i)+max\{state(i), curr\_slot-bmproduct(i)\}$
     ii.) $qslot(i)=max\{state(i), curr\_slot\}+peak\_int(i)$
     iii.) Enqueue the LCD on the TW at qslot(i)

Having reference to FIG. 2, the cell scheduler 102 is fed by a data enqueue mechanism 202 providing transmission/processing queues 204 with each queue including a logical channel descriptor (LCD) 206 or other such type of logical connection control block. The data enqueue mechanism 202 may be receive logic from the network 100, a stored program processor, or a combination of both of these mechanisms. Cell scheduler 102 uses the set of logical channel descriptors LCDs 206 that hold the data for each scheduled data entity. This may include a queue of data descriptors and configuration information for the transmission preparation logic. The scheduling selection logic of cell scheduler 102 selects a succession of LCDs and passes this selected succession to the transmission preparation logic 208. The transmission preparation logic 208 takes the LCD data structure selected by the scheduling selection logic 102 and prepares a transmission.

Referring to FIG. 2A, there is shown a chart illustrating the logical channel descriptor (LCD) 206 for a data stream used by cell scheduler 102. The LCD 206 is a data structure which describes a data stream cell queue. LCD 206 includes a next LCD pointer 209 for linking LCDs together at a timing wheel time slot. LCD 206 includes pointers to a chain of cells and/or packets to be transmitted including a head of cell/packet queue pointer 210 and a tail of cell/packet queue pointer 212. LCD 206 also includes scheduling information for the corresponding data stream shown as scheduling parameters 214, a scheduling state 216 and a timing wheel selector 218.

Referring to FIG. 2B, there is shown a chart listing multiple scheduling rate parameters 220 including a peak transmission rate 222, a sustainable transmission rate 224, a peak burst length 226, a constant bit rate/variable bit rate (CBR)/VBR traffic type 228, and a max delay 230. These scheduling rate parameters 220 are specified for a constant bit rate, variable bit rate or a leaky bucket rate connection. These rates are converted into intervals in terms of a number of fast timing wheel slots and fractions. The burst length is maintained as the maximum difference between the connection time stamp and the current time. The LCD also maintains a timestamp for the connection. An illustrated pseudo LCD is provided to provide multiple scheduling opportunities used by a best effort mechanism of the preferred embodiment for scheduling lower priority LCDs.

Referring to FIG. 3, the cell scheduler 102 is made up of data structures including at least two timing wheels, such as timing wheels 400, 402 illustrated in FIG. 4. As shown in FIG. 3, the data structures include a time wheel comprising an array 122 of pointers to LCDs and an occupancy bit map 120 of the time wheel, comprising a bit for each storage location in the time wheel. Each bit indicates whether the time wheel slot contains a valid pointer. This bit is used to control the need for reading memory locations and is used to support a fast scan forward. This bit array must be able to be read more than 1 bit at a time. This array of bits can be read as a group of bits at a time. This group of bits will be called a frame. Additionally, the LCD contains a pointer that can be used to point to the next LCD stored in the same "slot" in the time wheel. This pointer is used to create a "chain" of LCDs for each active time slot. Optionally the time wheel can contain a set of pointers that point to the last entry in the chain of LCDs. This second pointer can be used for fast insertion to the end of the chain of LCDs. While not a required element, this pointer is included in the preferred embodiment.

Having reference to FIG. 4, a fast timing wheel 400 and a slow timing wheel 402 are illustrated. As each slot in each timing wheel corresponds to a range of time, the fast timing wheel is used for smaller ranges of time, and the slow timing wheel is used for larger ranges of time. FIG. 4 illustrates the connections between these wheels 400 and 402, together with a last active bucket 404 used also for any LCDs with intervals greater than the slow timing wheel 402.

Figure 5:
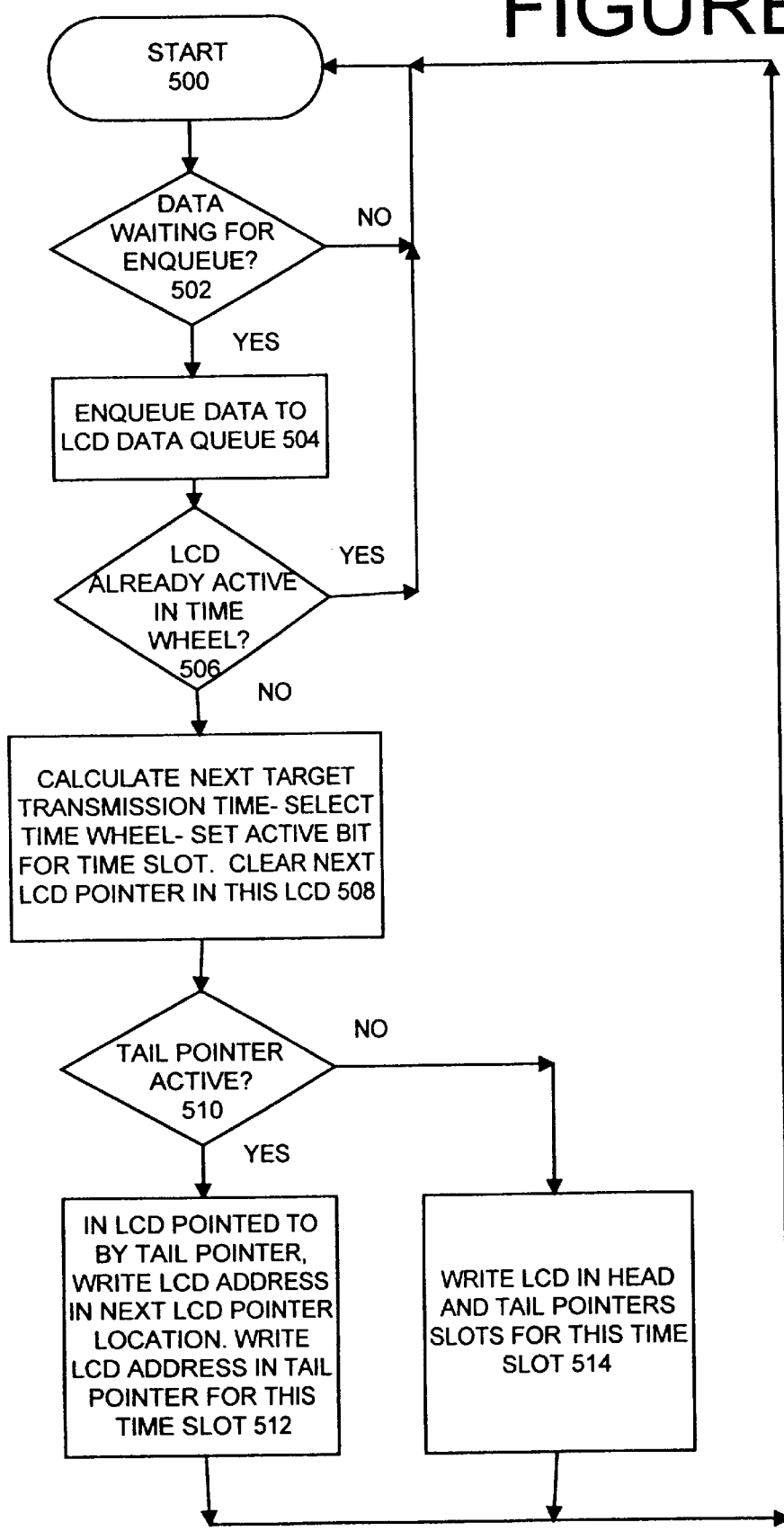
FIG. 5 is a flow chart illustrating sequential operations of the cell scheduler of the preferred embodiment of FIG. 1 to enqueue cells.

Referring to FIG. 5, the general process used by the cell scheduler 102 to enqueue is illustrated starting at a block 500. Checking for data waiting to be enqueued is performed as indicated at a decision block 502. If so, then the data waiting is enqueued to a LCD data queue as indicated at a block 504. Next checking for an LCD already active in the time wheel 400 is provided as indicated at a decision block 506. If so, then the sequential operations return to the beginning at block 500. If the LCD is not already active in the time wheel 400, then as indicated at a block 508 the next steps include to calculate a next target transmission, select a time wheel 400 or 402, set an active bit for a time slot, clear the next LCD pointer in this LCD. Next checking for an active tail pointer is provided as indicated at a decision block 510. For an active tail pointer, in the LCD pointed to by the tail pointer, the LCD address is written in the next LCD pointer location and the LCD address is written in the tail pointer for this time slot as indicated at a block 512. Otherwise, the LCD is written in the head and tail pointer slots for this time slot as indicated at a block 514. Then the sequential operations return to the beginning at block 500. While the head and tail pointers with chains is illustrated for double linked lists, it should be understood that appropriate other data structures can be used to associate LCDs with time slots and packets with LCDs.

Figure 6:
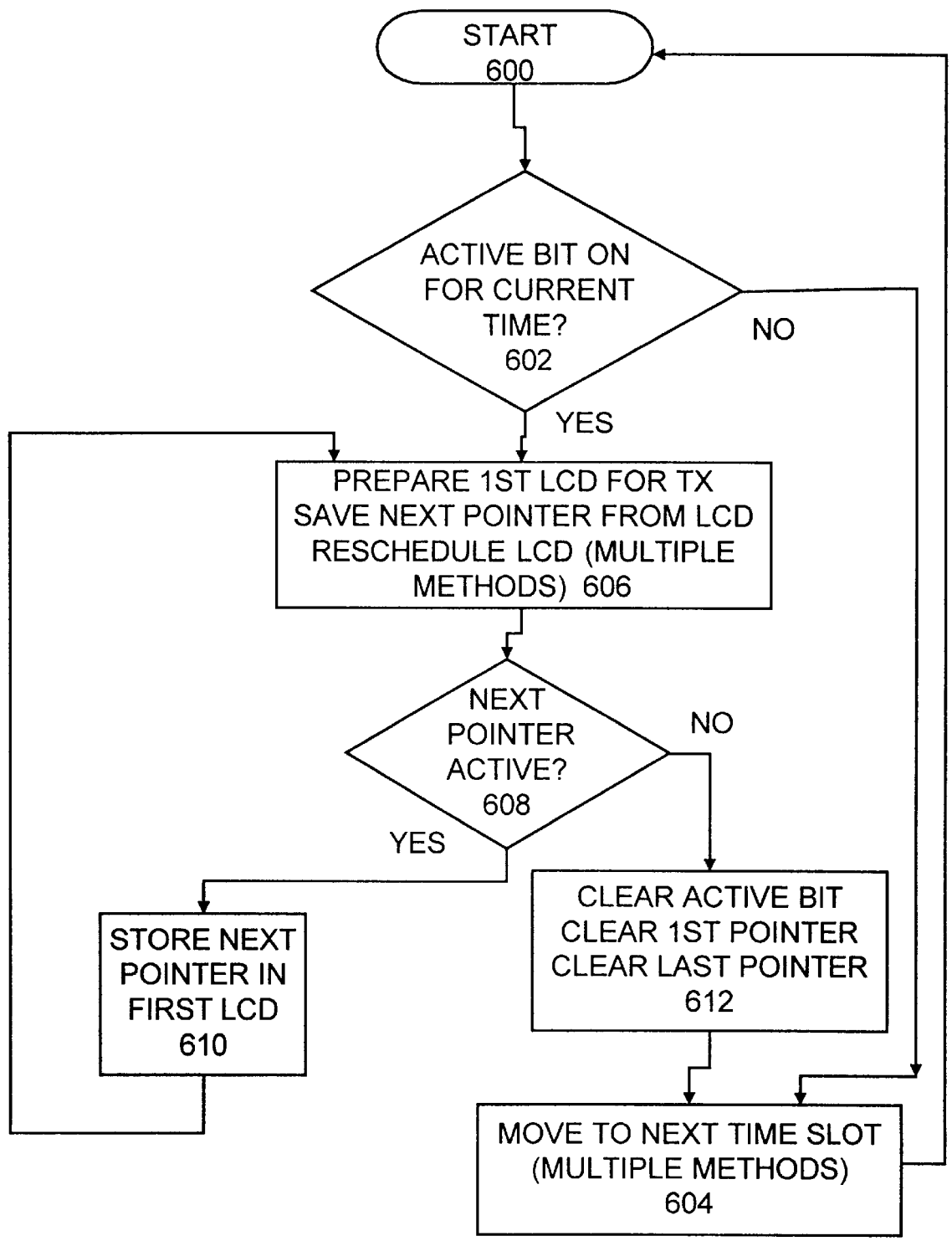
FIG. 6 is a flow chart illustrating sequential operations of the cell scheduler of the preferred embodiment of FIG. 1 to determine a next logical channel descriptor (LCD) to pass to transmission preparation logic.

Referring to FIG. 6, the general process used by the cell scheduler 102 to determine the next LCD to pass to the transmission preparation logic 206 is illustrated. As shown in FIG. 6, there are several possible mechanisms for calculating the next transmission time slot that an LCD should be moved to, and there are several mechanisms that may be used to calculate the move to the next time. Starting at a block 600, checking for an active bit on for the current time is performed as indicated at a decision block 602. When an active bit on for the current time is not identified, then a move to a next time slot is provided using one of multiple possible methods as indicated at a block 604. Then the sequential operation return to the beginning at block 600. Otherwise, when an active bit on for the current time is identified, then the first LCD is prepared for transmission (TX), a next pointer from the LCD is saved and the LCD is rescheduled using one of multiple possible methods as indicated at a block 606. Checking for a next pointer being active is provided as indicated at a decision block 608. If yes, then the next pointer is stored in the first LCD as indicated at a block 610. Then the sequential operations return to block 606 to prepare the first LCD for transmission. Otherwise when the next pointer is not active, then the active bit is cleared, the first pointer is cleared and the last pointer is cleared as indicated at a block 612. Then a move to a next time slot is performed at block 604. Then the sequential operation return to the beginning at block 600.

Referring to FIG. 7, exemplary steps for the move to the next time are shown. The sequential steps begin at a block 700. Checking for an active bit on in the current frame is performed as indicated at a decision block 702. Reading the bits frame by frame rather than bit by bit is important. When an active bit on in the current frame is not identified, then a next frame of active bits is read as indicated at a block 704. When an active bit on in the current frame is identified, then move to first active slot in current frame as indicated at a block 706. This completes the move to the next time operation as indicated at a block 708. After the next frame of active bits is read at block 704, then checking whether a slow wheel boundary is crossed is performed as indicated at a decision block 710. If not, then the sequential operations return to block 702 to check for an active bit on in the current frame. When a slow wheel boundary is crossed, then slow wheel processing is started as indicated at a block 712. Slow wheel processing is illustrated and described with respect to FIG. 7A. Using these two threshold mechanisms at blocks 702 and 710, the background logic which performs the slow timing wheel processing has 3 quarters of the fast timing wheel duration to complete the slow timing wheel processing without stopping the fast timing wheel processing.

As shown in FIG. 7A, starting at a block 714 processing the slow timing wheel data has two parts, when each section, such as, each quarter of the fast timing wheel 400 is crossed, the previous section or quarter of the fast timing wheel 400 is moved from the past to the future as indicated at a block 718, so that LCDs may be moved from the slow timing wheel 402 to the fast timing wheel 400. Before the processing moves from one quarter of the fast timing wheel 400 to the next, a check is performed as indicated at a decision block 716 to make sure that the slow wheel processing has completed processing of this quadrant of the fast timing wheel 400. Checking for any entries remaining in this segment of the slow timing wheel is performed as indicated at a decision block 720. If any entries are remaining in this segment of the slow timing wheel, then the LCD entry from the slow timing wheel is moved to a new location on either the fast timing wheel 400 or slow timing wheel 402 based upon the target transmission as indicated at a block 722. When determined at decision block 720 that no entries are remaining in this segment of the slow timing wheel, then this slow wheel segment form the past is moved to the future as indicated at a block 724. Then sequential slow wheel processing operations return to the beginning at block 714.

The specification of the scheduling rate for a constant bit rate, variable bit rate or a leaky bucket rate connection contains 4 parameters shown in FIG. 2A including peak transmission rate 222, a sustainable transmission 224, a peak burst length 226, and a CBR/VBR traffic type 228. The peak transmission rate 222, a sustainable transmission 224, a peak burst length 226 are maintained in intervals in terms of a number including fractions of time slots of fast timing wheel 400. The burst length is maintained as the maximum difference between the connection time stamp and the current time. A time stamp for each connection or data stream maintained in the corresponding LCDs is calculated as shown in FIG. 7B.

Figures 7B, 8A:
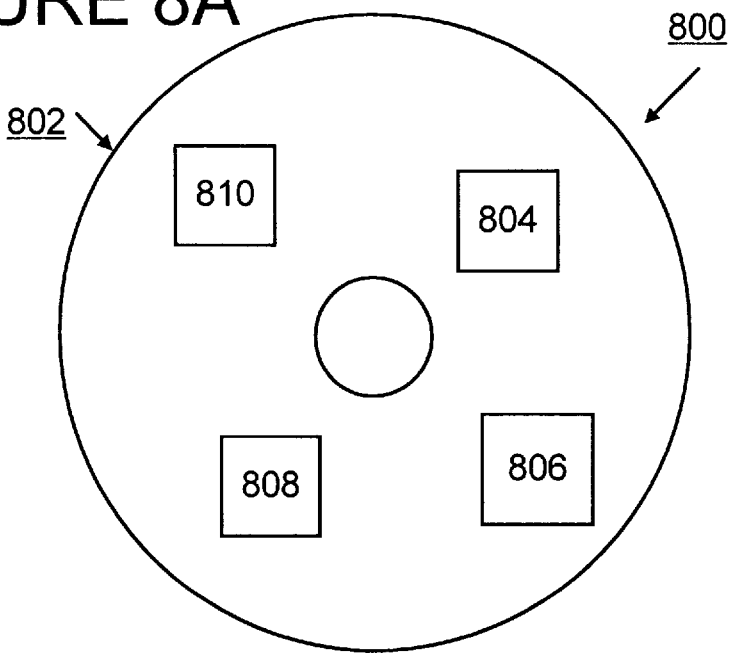
FIG. 7B is a flow chart illustrating calculation of a next timestamp and a next time slot by the cell scheduler of the preferred embodiment of FIG. 1.
FIG. 8A is a block diagram illustrating a computer program product in accordance with the preferred embodiment.

FIG. 7B illustrates calculation of a new timestamp and a new time slot by the cell scheduler 102. A new timestamp is calculated as indicated at a block 730 utilizing the following equation:

New timestamp=MAX(old timestamp+sustained interval, current time−burst limit).

A new time slot is calculated as indicated at a block 732 utilizing the following equation:

New time slot=MAX(timestamp+sustained interval, current time+peak interval), where peak interval is the minimum cell inter-arrival time in slots. The move forward and slow wheel processing method of FIGS. 7, and 7A and the new timestamp and new time slot calculation algorithms of FIG. 7B provide a self clocked fair queuing scheduling process maintaining a list of LCDs into the future.

Referring now to FIG. 8A, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the cell scheduling methods of this invention in the communications system 100 of FIG. 1.

A sequence of program instructions or a logical assembly of one or more interrelated modules defined by the recorded program means 804, 806, 808, 810, direct the cell scheduler 102 for scheduling the transmission of cells and frames in communications network 100.

FIG. 8 illustrates operation of a prior art leaky bucket scheduler that is fully loaded. FIG. 9 illustrates operation of a prior art leaky bucket scheduler that is partially loaded. FIGS. 10 and 11, and FIGS. 12 and 13 illustrate exemplary operations of a best effort weighted fair queuing cell scheduler 102 of the preferred embodiment of FIG. 1. In each of the FIGS. 8–13, the traffic rate characteristics of each LCDs listed at the top of the chart or table. In each of the example, the LCDs are initialized with all of the LCDs scheduled to transmit at time slot 1, and then the particular service discipline that is being demonstrated by the figure is exercised and illustrated in the lower portions of the tables.

Referring first to FIG. 8, four exemplary LCDs A, B, C, D are shown together with an average scheduling interval and rate at the top of the chart. The lower two tables include two bottom rows of timing wheel slots from time slot 1 through time slot 59 together with a corresponding succession of selected LCDs handled to the transmission preparation logic by the fully loaded leaky bucket cell scheduler at each time slot. The rows above the time slot row are used to show the queue of LCDs waiting on the timing wheel at illustrated time slots. As indicated in the flow charts, the service disciple of the LCD queues is FIFO, and it is interesting to note that the slower LCDs, that is the LCDs that are scheduled further into the future receive a more precise service scheduling than the faster LCDs, because they will be scheduled for a particular time slot farther in advance, so will be closer to the head of the service queue. It should also be noted that due to this effect, the slower LCDs are not treated as lower priority traffic and will not be starved for bandwidth.

For example, referring initially to FIG. 8, with the initial conditions, LCD D will be transmitted in time slot 1, then LCD D will be rescheduled to time slot 11, in time slot 2, LCD C will be transmitted, and then LCD C rescheduled to time slot 6, in time slot 3, LCD B will be transmitted, and then LCD B rescheduled to time slot 6 (but after LCD C), in time slot 4, LCD A will be transmitted and the rescheduled to time slot 5. The time slot 5 rescheduling is due to the peak transmission rate. LCD A has been delayed from the time that it should have been transmitted and it will then try to catch up. The leaky bucket algorithm provides this effect. The algorithm continues to run, and quickly settled to a repeating block starting at time slot 10 though time slot 19. This repeating block includes a sequence of LCDs A, D, C, B, A, A, C, B, A, A at time slots 10–19, 20–29, 30–39, 40–49, and 50–59, as shown. Due to the presence of the repeated block, statistics are simple to calculate. One should also note that B and C share the bandwidth fairly and that the order of transmission of two identically configured LCDs will remain constant.

FIG. 9 illustrates the behavior or operation of a prior art leaky bucket timing wheel scheduler when it is not fully loaded or partially loaded. In this example, the leaky bucket works well, each of the connections receives its bandwidth, and none of the connections exceed their bandwidth limitations. Note also that 10 out of each 36 time slots on the network contain no traffic.

Referring now to FIGS. 10, 11, 12, and 13, the operation of the best effort timing wheel scheduler 102 of the preferred embodiment is illustrated. The calculation of next time stamp and the next timing wheel time slot in the best effort timing wheel scheduler 102 is shown in FIG. 7A. The effect of this calculation and set of actions may be understood in the following FIGS. 10, 11, 12, and 13.

In FIGS. 10 and 11 and FIGS. 12 and 13, examples of operations are provided for the best effort timing wheel scheduler 102. In FIG. 10, a first sequence of transmission opportunities is shown where time slots that are skipped over by the best effort cell scheduler 102 are shown as blank time slots and are represented by n in the following: D, C, B, A, A, B, A, n, C, A, n, D, B, A, A, n, n, C, B, A, A, n, n, D, B, A, C, A, n, B, A, n, A, n, n, D, C, B, A, A, n, B, A, n, C, A, n, D, B, A, A, n, n, C, B, A, A This sequence takes 57 time slots to run. In FIG. 11, a second sequence is: D, C, B, A, A, B, A, C, A, D, B, A, A, C, B, A, A, D, B, A, C, A, B, A, A, and sequential repeating blocks of D, C, B, A, A, B, A, C, A, D, B, A, A, C, B, A, A. This sequence provided by best effort cell scheduler 102 has the same proportion of transmission time between the LCDs, but the rate of each LCD is increased.

In FIG. 12, the LCD A is removed from the traffic streams. A blank time slot represented by the letter n, is shown for each time slot scheduled for transmissions of LCD A of FIG. 10. The blank time slots represented by a dash -, are skipped over by the best effort cell scheduler 102, to provide the transmission cell sequence shown in FIG. 13. The sequence transmitted in this example, as shown in FIG. 13, is D, C, B, B, C, D, B, C, B, D, B, C, B, D, C, B, B, C, D, B, C, B, followed by sequential repeating blocks of D, B, C, B, D, C, B, B, C, D, B, C, B, as shown. Note that the relative ratios are still maintained, while the absolute rates are much higher.

While the present invention has been described with reference to the details of the embodiments of the invention shown in the drawing, these details are not intended to limit the scope of the invention as claimed in the appended claims.

What is claimed is:

1. A method for scheduling the transmission of cells of a plurality of data streams in a communications network comprising the steps of:

enqueuing data of each data stream to a corresponding data cell queue;

calculating a target transmission time for each said data cell queue utilizing predetermined logical scheduling rate parameters of each data stream; including the steps of maintaining peak transmission rate and sustainable transmission rate connection parameters in terms of timing wheel time slot intervals and utilizing a calculation algorithm represented by:

New timestamp=MAX(old timestamp+sustained interval, current time−burst limit);

responsive to each said calculated next target transmission time, calculating a timing wheel time slot in a timing wheel, setting an active indication for said identified timing wheel time slot and storing an entry to point to said corresponding data cell queue for said identified timing wheel time slot;

selecting a next data cell queue for transmission by checking for said active indication in a current timing wheel time slot of said timing wheel;

responsive to identifying said active indication, processing a first data cell queue for transmission and rescheduling said data cell queue;

moving to a next timing wheel time slot by checking for an active indication in a current frame of active indicators corresponding to timing wheel time slots of said timing wheel; and responsive to identifying said active indication in said current frame, moving to a first active timing wheel time slot in said current frame.

2. A method for scheduling the transmission of cells of a plurality of data streams in a communications network as recited in claim 1 further include the step of defining scheduling opportunities utilizing a predefined pseudo data cell queue; and wherein said step of calculating said target transmission time for each said data cell queue utilizing predetermined logical scheduling rate parameters of each data stream includes said predefined pseudo data cell queue, and said identified target transmission time for said predefined pseudo data cell queue defining scheduling opportunities of multiple timing wheel time slots.

3. A method for scheduling the transmission of cells of a plurality of data streams in a communications network as recited in claim 1 includes the step of: responsive to an absence of said active indication in said current frame, and reading a next frame.

4. A method for scheduling the transmission of cells of a plurality of data streams in a communications network as recited in claim 1 wherein the step of moving to said next timing wheel time slot by checking for said active indication in said current frame of timing time slots of said timing wheel includes the steps of identifying a next available time slot having said entry for said corresponding data cell queue within a block of timing wheel time slots, and moving to said identified next available time slot.

5. A method for scheduling the transmission of cells of a plurality of data streams in a communications network as recited in claim 1 wherein the step of calculating said time slot in said timing wheel includes utilizing a calculation algorithm represented by:

New time slot=MAX(timestamp+sustained interval, current time+peak interval).

6. A method for scheduling the transmission of cells of a plurality of data streams in a communications network as recited in claim 5 wherein the step of processing lower priority timing wheel entries includes the step of moving an entry from said lower priority timing wheel to said higher priority timing wheel.

7. A method for scheduling the transmission of cells of a plurality of data streams in a communications network as recited in claim 3 further includes the steps of selecting a higher priority timing wheel or a lower priority timing wheel for each said calculated next target transmission time for each said data cell queue, and wherein the step of responsive to said absence of said active indication in said current frame, includes the step of processing lower priority timing wheel entries.

8. A method for scheduling the transmission of cells of a plurality of data streams in a communications network as recited in claim 7 wherein the step of processing lower priority timing wheel entries includes the step of checking for completion of first wheel processing of a portion of said current frame.

9. A method for scheduling the transmission of cells of a plurality of data streams in a communications network as recited in claim 7 wherein the step of processing lower priority timing wheel entries includes the step of moving an entry from said lower priority timing wheel to a new time slot of said lower priority timing wheel.

10. A method for scheduling the transmission of cells of a plurality of data streams in a communications network as recited in claim 7 wherein the step of processing lower priority timing wheel entries includes the step of moving a portion of said current frame of said higher priority time wheel from the past to the future.

11. A method for scheduling the transmission of cells of a plurality of data streams in a communications network as recited in claim 7 wherein the step of processing lower priority timing wheel entries includes the step of moving a portion of said lower priority timing wheel from the past to the future.

12. Apparatus for scheduling the transmission of cells of a plurality of data streams in a communications network comprising:

means for enqueuing data of each data stream to a corresponding data cell queue;

means for calculating a target transmission time for each said data cell queue utilizing predetermined logical scheduling rate parameters of each data stream; said target transmission time calculating means including means for maintaining peak transmission rate and sustainable transmission rate connection parameters in terms of timing wheel time slot intervals and means for utilizing a calculation algorithm represented by:

New timestamp=MAX(old timestamp+sustained interval, current time–burst limit);

means responsive to each said calculated next target transmission time, means for calculating a timing wheel time slot in a timing wheel, means for setting an active indication for said identified timing wheel time slot and means for storing an entry to point to said corresponding data cell queue for said identified timing wheel time slot;

means for selecting a next data cell queue for transmission including means for checking for said active indication in a current timing wheel time slot of said first timing wheel;

means, responsive to identifying said active indication, for processing a first data cell queue for transmission and rescheduling said data cell queue;

means for moving to a next timing wheel time slot including means for checking for an active indication in a current frame of active indications corresponding to timing wheel time slots of said timing wheel; and means, responsive to identifying said active indication in said current frame, for moving to a first active timing wheel time slot in said current frame.

13. Apparatus for scheduling the transmission of cells of a plurality of data streams in a communications network as recited in claim 12 further includes means for defining scheduling opportunities utilizing a predefined pseudo data cell queue; and wherein said means for calculating said target transmission time for each said data cell queue utilizing predetermined logical scheduling rate parameters of each data stream includes said predefined pseudo data cell queue, and said identified target transmission time for said predefined pseudo data cell queue defining scheduling opportunities of multiple timing wheel time slots.

14. Apparatus for scheduling the transmission of cells of a plurality of data streams in a communications network as recited in claim 12 further includes means, responsive to an absence of said active indication in said current frame, for reading a next frame.

15. Apparatus for scheduling the transmission of cells of a plurality of data streams in a communications network as recited in claim 14 further includes means for selecting a higher priority timing wheel or a lower priority timing wheel for each said calculated next target transmission time for each said data cell queue, and wherein said means, responsive to an absence of said active indication in said current frame, further includes means for processing lower priority timing wheel entries including means for moving an entry from said lower priority timing wheel to said higher priority timing wheel.

16. Apparatus for scheduling the transmission of cells of a plurality of data streams in a communications network as recited in claim 15 wherein said means for processing lower priority timing wheel entries include means for checking for completion of higher priority wheel processing of a portion of said current frame.

17. A computer program product for use in a data communications network having a cell scheduler for scheduling the transmission of cells of a plurality of data streams in said communications network, the computer program product comprising:

a record medium;

means, recorded on said recording medium, for storing a corresponding data cell queue for each of the plurality of data streams;

means, recorded on said recording medium, for storing predetermined logical channel control parameter values for each data cell queue;

means, recorded on said recording medium, for calculating a next target transmission time for each data cell queue; said target transmission time calculating means including means for maintaining peak transmission rate and sustainable transmission rate connection parameters in terms of timing wheel time slot intervals and means for utilizing a calculation algorithm represented by:

New timestamp=MAX(old timestamp+sustained interval, current time–burst limit);

means, recorded on said recording medium, for calculating a timing wheel time slot in a timing wheel, for setting an active indication for said identified timing wheel time slot, and for storing an entry to point to said corresponding data cell queue for said identified timing wheel time slot;

means, recorded on said recording medium, for selecting a next data cell queue for transmission including means for checking for said active indication in a current timing wheel time slot of said timing wheel; means, responsive to identifying said active indication, for processing a first data cell queue for transmission and rescheduling said data cell queue; means for moving to a next timing wheel time slot including means for checking for an active indication in a current frame of timing wheel time slots of said timing wheel; and means, responsive to identifying said active indication in said current frame, for moving to a first active timing wheel time slot in said current frame.

18. A computer program product for use in a data communications network having a cell scheduler for scheduling the transmission of cells of a plurality of data streams as recited in claim 17 further includes means, recorded on said recording medium, for defining scheduling opportunities utilizing a predefined pseudo data cell queue; and wherein said means, recorded on said recording medium, for calculating said target transmission time for each said data cell queue includes said predefined pseudo data cell queue, and said identified target transmission time for said predefined pseudo data cell queue defining scheduling opportunities of multiple timing wheel time slots.

19. A computer program product for use in a data communications network having a cell scheduler for scheduling the transmission of cells of a plurality of data streams as recited in claim 17 wherein said means, recorded on said recording medium, for selecting said next data cell queue for transmission further includes means, responsive to an absence of said active indication in said current frame, for reading a next frame.

20. A computer program product for use in a data communications network having a cell scheduler for scheduling the transmission of cells of a plurality of data streams as recited in claim 19 further includes means for selecting a higher priority timing wheel or a lower priority timing wheel for each said calculated next target transmission time for each said data cell queue, and wherein said means, responsive to an absence of said active indication in said current frame, further includes means for processing lower priority timing wheel entries including means for moving an entry from said lower priority timing wheel to said higher priority timing wheel.

21. A best effort scheduler for scheduling the transmission of cells of a plurality of data streams in a communications network comprising:

memory means for storing a corresponding data cell queue for each of the plurality of data streams;

means for storing predetermined logical channel control parameter values for each data cell queue, means for calculating a target transmission time for each said data cell queue utilizing predetermined logical scheduling rate parameters of each data stream; said target transmission time calculating means including means for maintaining peak transmission rate and sustainable transmission rate connection parameters in terms of timing wheel time slot intervals and means for utilizing a calculation algorithm represented by:

New timestamp=MAX(old timestamp+sustained interval, current time−burst limit);

means responsive to each said calculated next target transmission time, for calculating a timing wheel time slot in a timing wheel, means for setting an active indication for said identified timing wheel time slot and means for storing an entry to point to said corresponding data cell queue for said identified timing wheel time slot;

means for selecting a next data cell queue for transmission including means for checking for said active indication in a current timing wheel time slot of said first timing wheel;

means, responsive to identifying said active indication, for processing a first data cell queue for transmission and rescheduling said data cell queue;

means for moving to a next timing wheel time slot including means for checking for an active indication in a current frame of active indications corresponding to timing wheel time slots of said timing wheel; and means, responsive to identifying said active indication in said current frame, for moving to a first active timing wheel time slot in said current frame.

* * * * *

UNITED STATES PATENT AND TRADEMARK OFFICE
CERTIFICATE OF CORRECTION

PATENT NO. : 5,844,890

DATED : December 1, 1998

INVENTOR(S) : Gary Scott Delp et al

It is certified that error appears in the above-identified patent and that said Letters Patent is hereby corrected as shown below:

On the title page item [54] Col.1

"BANDWITH" should be --BANDWIDTH--.

Signed and Sealed this

First Day of June, 1999

Attest:

Attesting Officer

Q. TODD DICKINSON

Acting Commissioner of Patents and Trademarks